United States Patent [19]

Aikens

[11] Patent Number: 4,996,632
[45] Date of Patent: Feb. 26, 1991

[54] MULTI-COLOR ILLUMINATING SYSTEM

[75] Inventor: Wallace R. Aikens, Plano, Tex.

[73] Assignee: Gulton Industries, Inc., Plano, Tex.

[21] Appl. No.: 255,062

[22] Filed: Oct. 7, 1988

[51] Int. Cl.$^5$ .................... F21V 5/00; G09F 13/00
[52] U.S. Cl. .................... 362/32; 362/293;
362/31; 362/322; 362/282; 350/96.10; 350/311;
40/546; 40/547; 40/431; 40/581
[58] Field of Search .................... 362/31, 32, 293, 322,
362/324, 319, 340, 247, 812, 23, 26, 27, 30, 235,
242, 243, 372, 427, 277, 282, 284; 40/546, 547,
581, 431; 350/167, 286, 96.10, 311

[56] References Cited

U.S. PATENT DOCUMENTS

| | | | |
|---|---|---|---|
| 569,764 | 10/1896 | Nason | 40/431 |
| 1,615,449 | 3/1925 | Fullerton | 40/546 |
| 1,741,748 | 12/1929 | White | 40/546 |
| 1,837,091 | 12/1937 | Adams | 362/301 |
| 2,018,732 | 10/1935 | May | 362/32 |
| 2,041,909 | 5/1936 | Emmert et al. | 40/427 |
| 2,374,640 | 4/1945 | Paul | 40/431 |
| 2,493,829 | 1/1950 | Paul | 40/431 |
| 2,567,403 | 9/1951 | Rockola | 40/431 |
| 2,795,069 | 6/1957 | Hardesty | 40/546 |
| 2,831,283 | 4/1958 | Bone | 40/581 |
| 3,302,012 | 1/1967 | Keppisch | 362/32 |
| 3,399,476 | 9/1968 | Davis | 40/546 |
| 3,486,261 | 12/1969 | Hardesty | 40/546 |
| 4,525,772 | 6/1985 | Peck | 362/293 |
| 4,558,401 | 12/1985 | Tysoe | 362/293 |
| 4,561,043 | 12/1985 | Thompson | 362/32 |
| 4,750,798 | 6/1988 | Whitehead | 362/32 |
| 4,805,984 | 2/1989 | Cobb, Jr. | 350/96.28 |

FOREIGN PATENT DOCUMENTS 688289  1/1930  France .

*Primary Examiner*—Stephen F. Husar
*Assistant Examiner*—D. M. Cox
*Attorney, Agent, or Firm*—Darby & Darby

[57] ABSTRACT

An arrangement and method for providing an elongated light source, such as for illuminating a sign or the like or for other display, which includes emitting light from an exterior light source into an inner tube having a portion lined with a high reflectance film of prismatic lenses, the tube having a light-transmitting opening along its length, with a diffusing medium substantially diametrically opposite such opening, and optionally a reflector at one end of the inner tube. The inner tube is concentrically surrounded by an outer tube having light-transmissive portions of different colors. The outer tube is rotatable relative to the inner tube. The emitted light propagates in the inner tube by reflecting from the high reflectance lining and the reflector to impinge on the diffusing medium and thereby transmit light outwardly through the light-transmissive opening and thereafter through a selected one of the colored portions so as to project colored light against a sign or like object. The arrangement and method may be used as a color display, for both ambient-light and internal illumination, by interspersing the light-transmissive portions with opaque portions of substantially the same color. Several units may be placed end to end to provide a color-code display.

39 Claims, 3 Drawing Sheets

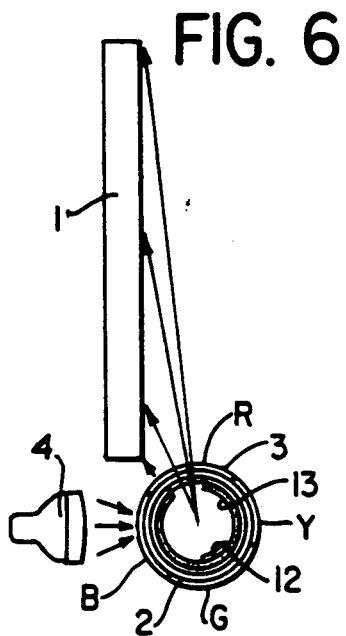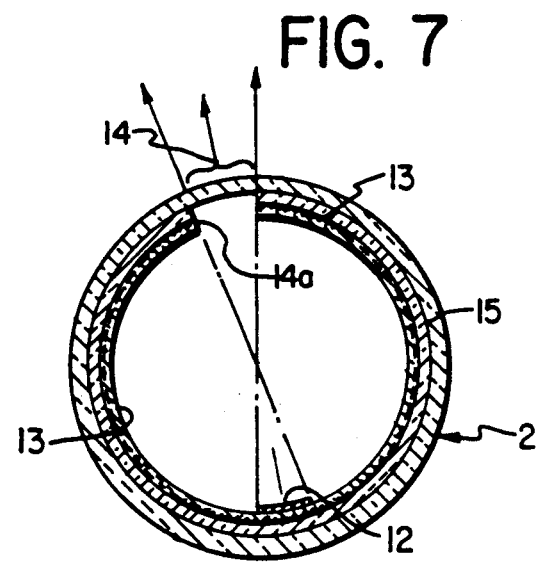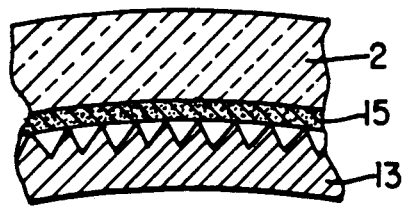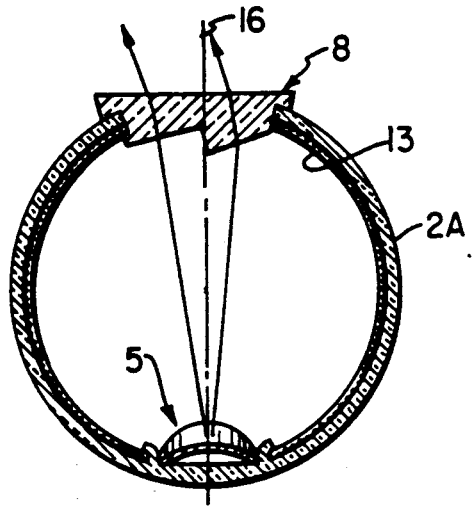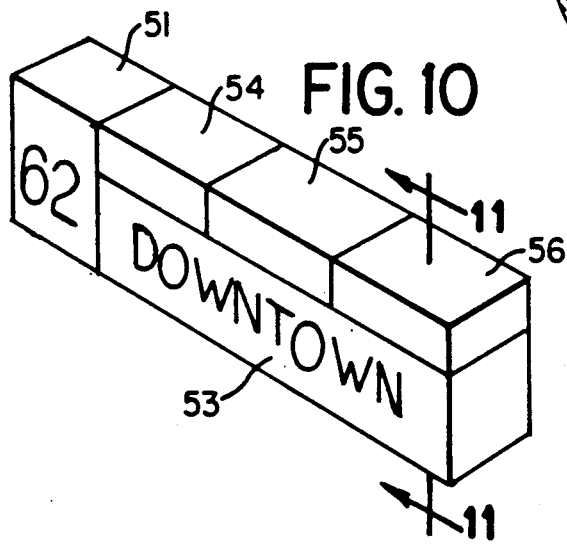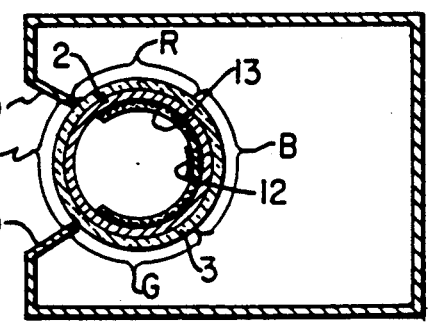

MULTI-COLOR ILLUMINATING SYSTEM

BACKGROUND OF THE INVENTION

The present invention relates to a multi-color illuminating system, particularly useful for route and destination signs, such as for buses or other vehicles.

Readability of signs, such as those for route and destination indication on public motor vehicles, buses and trains, is affected by day and night conditions, such as glare and external light. Sign readability can be improved by making the lettering of the sign to contrast in color from the rest of the sign. The greater the contrast, the easier the lettering is to read. While illumination systems have been employed to improve readability, existing illumination systems do not provide a uniform or even distribution of light. Bright spots, darkened areas at the end of the sign, and a halo of light along the bottom of the sign may appear, depending upon the arrangement of the light source utilized for illumination.

An optical film designed to convert point sources of light into an evenly dispersed area of light has been developed under the trade name 3M Brand Scotchlamp Film, and is shown in U.S. Pat. No. 4,260,220. The film is made of transparent plastic in sheet form, which is smooth on one side and grooved on the other. Its thickness is about 20 mils (0.02 inch). The grooves are actually tiny optical prisms with fragile corners and delicate faces. The film is flexible, and may be readily rolled or bent.

This film is used as a part of prism light guides which distribute sunlight received from a solar light tracking system to illuminate indoor office space evenly. In the February 1987 issue of the trade magazine Architectural Lighting, there was an article about this application which suggests illuminating decorative, attention-getting displays with such prism light guides. This article suggests that colored light could be provided by fitting a luminaire with colored PAR lamps. The light could be controlled in three ways: electronic dimmers and a small microprocessor; rotating filter wheels with different colored gels; or solenoid-operated dichroic filters in front of white light sources.

Further, the use of rotatable translucent multi-color tubes is known in which a light source is arranged directly inside the tube itself and portions of the color tube are shielded so that only a desired colored segment of the color tube is illuminated by the light source. An example of such a tube is disclosed in U.S. Pat. No. 2,374,640.

SUMMARY OF THE PRESENT INVENTION

It is an object of the present invention to improve the readability of signs by illuminating them with evenly distributed light which may be selectively colored.

It is also an object to provide an improved elongated light source, which may be selectively colored.

In keeping with this object, and others which will become apparent below, one aspect of the present invention resides in an arrangement for illuminating, comprising a source emitting light into a tube with a transparent portion. The light source may be arranged outside of the tube so as to emit light into the tube through an open end. A high reflectance or transreflective film covers a portion of the inner surface of the inner tube and distributes light along the length of the tube, which has a longitudinal area through which light is transmissible. The film is preferably formed with optical prisms for multiply reflecting the light inside the tube.

A diffusing medium is arranged in the tube diametrically opposite the light-transmissive longitudinal area so that after the light strikes the diffusing medium, the light is scattered or diffused outwardly through the longitudinal area. A reflector may be placed at the opposite end of the inner tube from the light source to reflect light back into the tube.

It is an additional object to provide selective colored illumination, as by providing an outer tube having a plurality of transparent or translucent colored portions each of a different color and concentrically surrounding such a tube. The outer tube is rotatable into a predetermined position by a motor drive to select a desired color for illumination. The outer tube is formed so that when in a predetermined position only one of its color portions is exposed to the light transmitted through the inner tube's light-transmissive longitudinal area.

It is a further object to provide an improved illumination, as by use of a lens in the light-transmissive longitudinal area.

It is another object to provide improved color illumination, as by use of one or more extensions on the outer tube adapted to receive color inserts or by use of color silkscreened on the outer tube.

It is yet another object to provide an improved elongated illuminating arrangement having substantially uniform illumination along its length.

For a better understanding of the present invention, reference is made to the following description and accompanying drawings while the scope of the invention will be pointed out in the appended claims.

BRIEF DESCRIPTION OF THE DRAWINGS

FIG. 6 is a schematic end elevation view of the arrangement of FIG. 4, in which light rays are represented by arrows.

FIG. 7 is a transverse sectional view of the light guide tube of FIG. 6 by itself.

FIG. 8 is an enlarged fragmentary view of a portion of the tube of FIG. 7.

FIG. 9 is a transverse sectional view of a light guide tube in accordance with a second embodiment of the invention.

FIG. 10 is a perspective view of a destination sign, for buses or the like, utilizing three selectable-color light tubes similar to those of FIGS. 1-8 and 9.

FIG. 11 is a transverse sectional view of one of the light guide tubes of FIG. 10.

DETAILED DESCRIPTION OF THE PREFERRED EMBODIMENTS

Figure 4:
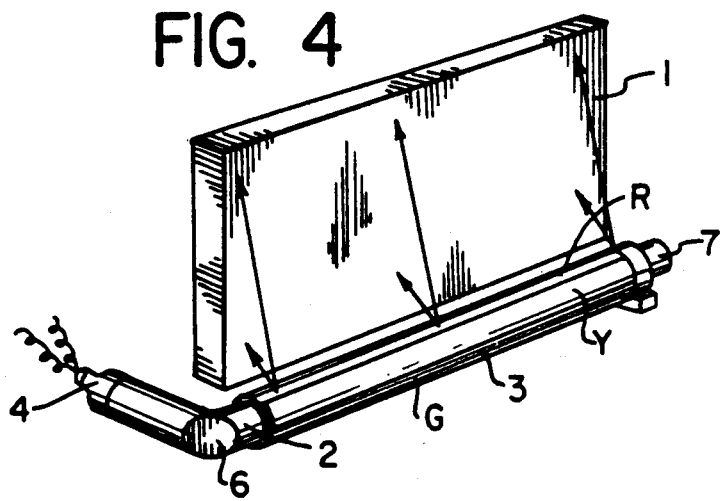
FIG. 4 is a schematic perspective view of a multi-color illumination arrangement in accordance with the present invention, in place for illuminating a sign.
Figure 5:
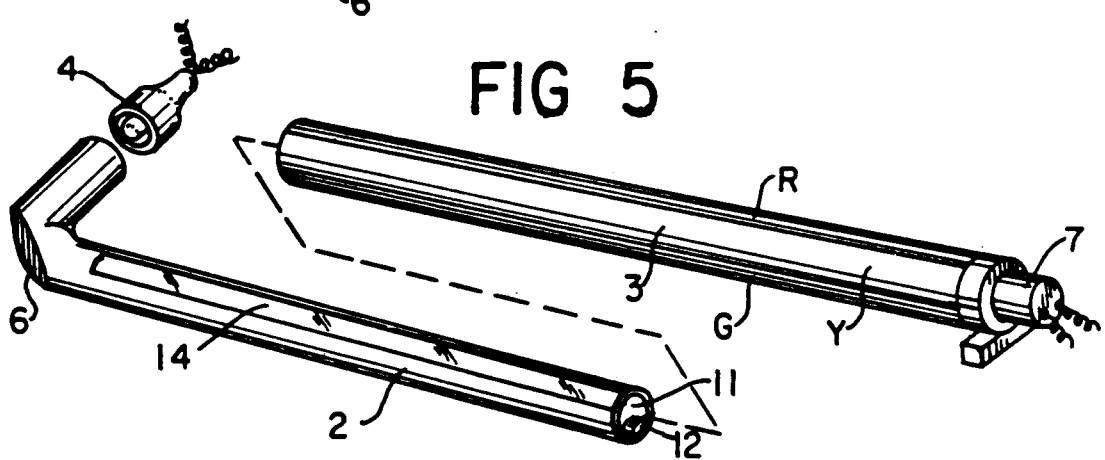
FIG. 5 is a schematic exploded perspective view of the arrangement of FIG. 4.

Referring now to FIGS. 4 to 6 of the drawings, a sign 1 is illuminated by evenly distributed colored light from a multi-colored illumination arrangement. This arrangement includes a light source 4 with reflector, an inner tube 2, an outer tube 3, reflectors 6, 11, a diffusing medium 12, a high reflectance light-distribution film 13, and a motor assembly 7.

The reflector 6 is angled to reflect light emanating from the light source 4 into the inner tube 2. The reflector 6 is preferably made of 3M SILVERLUX material.

The light then propagates inside the inner tube by reflecting off the high reflectance film or sheet 13 which is preferably 3M Scotchlamp film, whose properties are described below. Reflector 11 is arranged at the end of the inner tube 2 furthest from the light source 4 so as to reflect propagated light back into the inner tube 2.

The diffusing medium 12, which may be a dull white colored strip or coating to enable diffusion or scattering of the light impinging thereon, extends along the length of the inner tube 2 near the bottom, as seen in FIG. 7. The diffusing medium 12 is substantially diametrically opposite a longitudinally extending light-transmissive portion or opening 14 in the wall of the inner tube 2, which registers with a gap 14A in the film 13. When the light strikes the diffusing medium 12, the light diffuses or scatters, with some passing through the light-transmissive portion 14. The rest is multiply reflected by film 13, ultimately striking diffusing medium 12 to pass through light-transmissive portion 14. The diffusing medium may be a dull white strip laid or coated on the inner surface of the film 13. Alternately, the film 13 may have a longitudinal slot into which the diffusing medium is placed.

Figure 1:
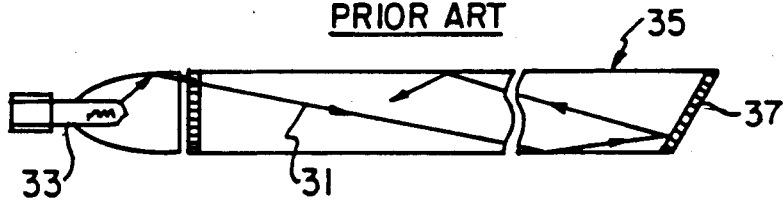
FIG. 1 is a schematic side longitudinal view of a light guide tube with light propagating through the tube from a light source, in accordance with the prior art.
Figure 2:
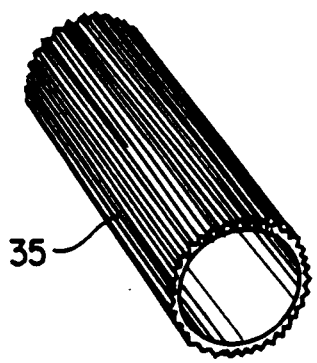
FIG. 2 is a schematic perspective view of the light guide tube of FIG. 1.
Figure 3:
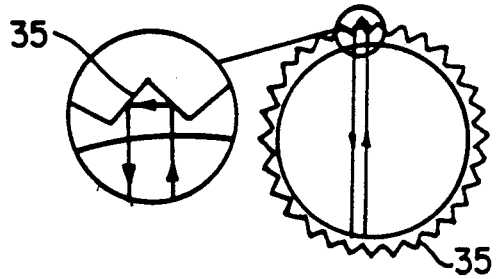
FIG. 3 is a schematic transverse view of the device of FIG. 2, in which light rays are shown, to illustrate total internal reflection from prism faces, with the encircled portion shown also enlarged.

The high reflectance film 13 is a thin, flexible, clear transparent material, such as acrylic or polycarbonate polymer, with a smooth surface on one side and prismatic grooves on the other side, which form on the inner surface of inner tube 2 tiny optical prisms that extend longitudinally along tube 2. The properties of such a film are illustrated in FIG. 1, which schematically shows a light guide tube 35 and an external light source 33 with reflector. The light guide tube 35 is formed of Scotchlamp material, having a transparent wall with a grooved outer surface forming prismatic facets, which are efficient total internal reflection surfaces and prevent light which is travelling down the guide tube from escaping through the film 13. Each prismatic facet has two prism faces inclining outward towards each other and into contact with each other so as to have a V-like shape. These are more clearly shown in FIGS. 2 and 3.

Referring again to FIG. 1, it can be seen that a light ray 31, emitted from the external light source 33, strikes the interior of the transparent wall of a guide tube 35, through which the light refracts in accordance with Snell's law to pass through the body of the transparent wall.

If the ray strikes one prism face at any angle less than the critical angle for total internal reflection, it reflects by total internal reflection and heads for the other prism face of the same prismatic facet. If reflected by total internal reflection again, it returns to the interior of the tube for further propagation. A ray will be reflected if the angle it makes with the tube axis is less than about 27 degrees. The exact angular value is dependent upon the refractive index of the transparent material.

Upon reaching the end of the tube 35 which is furthest from the light source 33, the light ray is reflected by a reflector 37 back into the guide tube. The film 13 is formed to reflect the light and to minimize absorption and transmission. Absorption per bounce for a typical ray has been found to be as low as a 0.12% and residual transmission losses maybe about 1.2% for typical angles of incidence. Reflectance is thus about 98.7%.

In order to avoid even residual transmission losses, a white surface 15 may be added between the inner tube 2 and the high reflectance film 13 as shown in FIG. 7. Thus, light which may be transmitted through the film 13, which would otherwise be a residual transmission loss, is diffused or reflected back into the inner tube from the white surface 15 and is thereby retained to enhance efficiency.

Referring again to FIGS. 4 to 7, the outer tube 3 concentrically surrounds the inner tube 2. A motor assembly 7 is used to rotatably position the outer tube 3 relative to the inner tube 2 in any conventional manner. The outer tube 3 is formed of a number of longitudinal light-transmissive (transparent or translucent) colored filter sections (as seen in FIG. 6), any one section being positionable to be opposite the light-transmissive portion 14. The color filter segments of the outer tube 3 may be in the form of either transparent color inserts suitably held to the outer tube, as by projecting lips, or transparent color silk-screened onto the segments of the tube 3. Preferably, the outer tube 3 is divided into color quadrants, each quadrant having a different color such as green G, red R, yellow Y, and blue or black B, each of which extends substantially along the full length of the outer tube 3. In this way the light then projects outwardly from the entire length of the sign 1 to effect illumination of the sign 1 with a single colored light.

Figure 12:
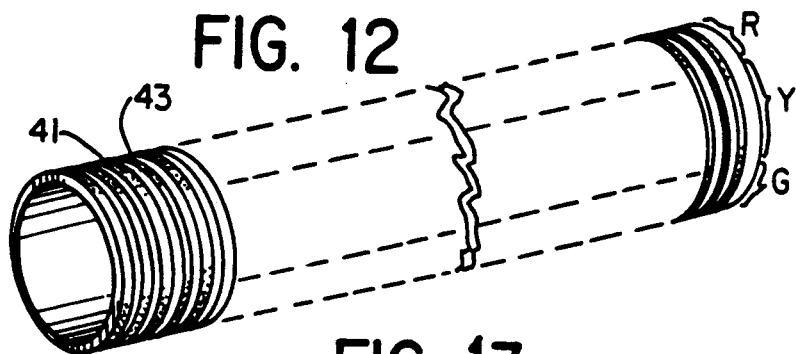
FIG. 12 is a perspective view of a multiple-color outer tube useful in the preceding embodiments.
Figure 13:
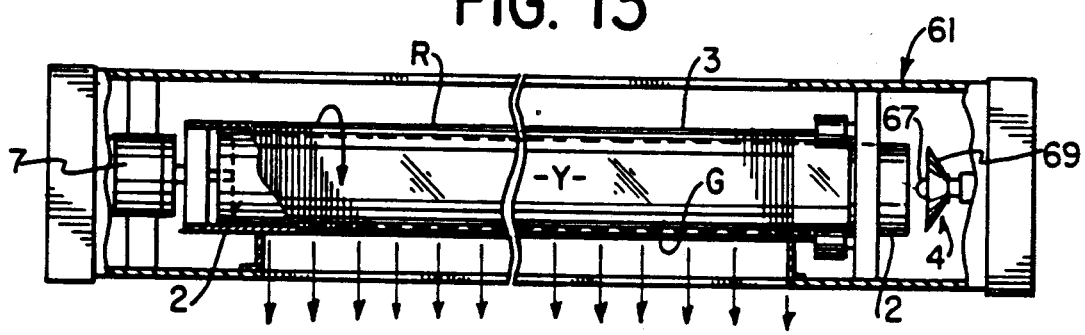
FIG. 13 is a longitudinal view partly in section of a multi-color extended light source useful in preceding embodiments.

When used in a bus sign, for example, the colored light transmitted by the colored filter sections R, Y, G, B may not be highly visible in daylight, and such colored light-transmitting filter sections are usually poor light reflectors, leading to poor daylight visibility. This may be overcome by making each color-transmitting section partially efficiently light-transmissive and partially efficiently light-reflective. For example, as shown in FIG. 12, each section R, Y, G or B may be formed of alternate stripes 41 of color-filter material (shown stippled) and intervening stripes 43 of color-reflecting material. In each quadrant, the color-filtering and color-reflecting materials are preferably chosen to have closely similar color as perceived either in daylight or night-time.

If desired, a controller or a computer may be used to control the positioning of the outer tube 3 so that a desired color segment R, Y, G, or B will be exposed to filter the light passing through the light-transmissive portion of the inner tube 2 or to be reflected by ambient light.

The light source 4 does not necessarily have to be arranged perpendicular to the axis of the inner tube 2. Any angular orientation can be used if accompanied by an appropriate position of the reflector 6 to reflect the light nearly axially into the inner tube 2. If the light source 4 and the inner tube 2 are substantially co-linearly arranged, no reflector 6 is needed. A reflector may be used surrounding the light source or bulb, to focus the light rays to be substantially axial of or slightly converging along the tube, as indicated schematically in FIG. 6. However, a perpendicular orientation for the light axis source is preferred to obtain better accessibility to the light source bulb for replacement purposes, and to reduce the axial dimensions of the system. This is advantageous when the sign to be illuminated is on a bus, since there may be insufficient space available at the side of the sign for gaining access to the bulb and effecting removal and replacement when needed.

FIG. 7 shows a schematic sectional view of the inner tube alone, depicting the path of certain light rays. The only light emitted to the exterior is through the light-transmissive portion 14, derived from the diffusing medium 12. The film 13 on the inner surface of tube 2 between diffusing medium 12 and the light-transmissive portion 14 serves primarily to distribute the light uniformly along the length of the tube 2, without directly passing through the light-transmissive portion 14. After multiple reflections, the light ultimately hits the diffusing medium 12. Those rays from diffusing medium 12 which do not exit from the light-transmissive portion 14 are internally reflected and multiply, with little loss, to impinge again on diffusing medium 12. Thus, ultimately nearly all the light energy is emitted through the light-transmissive portion 14, with very little loss.

FIG. 9 shows a view similar to FIG. 7 for a second embodiment. In FIG. 9, an opaque tube 2A, which may be an aluminum extrusion, is used in the same way as inner tube 2. The opaque inner tube 2A also has a portion lined with the high reflectance film 13 except for an unlined portion or gap in the form of a longitudinal slit in which is placed a lens 8 which longitudinally extends along a length of the tube 2A. In order to avoid residual transmissive losses through the film 13, the inner surface of the tube 2A is made white or reflective so that light transmitting through the film diffuses or reflects back into the tube 2A and is thereby retained.

The lens 8 may be designed in known manner to provide a more uniform illumination from the bottom to the top of a sign 1 (see FIG. 6) and to adjust for the shorter path length for light rays impinging on the lower portion of the sign 1. The lens 8 may be linear, prismatic, clear and illustratively is composed of polycarbonate material.

A diffusing medium 5 is also arranged diametrically opposite the lens 8 and for improved uniformity of light distribution along the tube length may be of a varying width. The diffusing medium 5 widens as it extends longitudinally away from the light source 4 in the embodiment of FIG. 5. As one example, the diffusing medium may have a width 5A of 0.43 inches nearest the light source, a width 5B of 0.58 inches about midway along the length of the inner tube 2, and a width 5C of 0.88 inches furthest from the end light source 4 or nearest the reflector 6. This varying width may be provided by bulging the diffusing material to provide a varying curved-surface width along the length of tube 2A. This may be provided, for example, by forming a uniform width groove or slot in the tube 2A, with edges to retain a strip of diffusing material of gradually varying width, providing gradually varying bulging of the strip along its length. This varying width aids in providing uniformity of illumination along the length of the light tube 2 by compensating for a tendency for a greater amount of light to pass through the light-transmissive portion 14 nearer the source than at the remote end of tube 2A.

Also, the lens 8, which is preferable of a unitary piece construction, may have two or more transverse sections 8A and 8B. Such sections are useful to project the diffused light rays on either side of the centerline 16 of FIG. 9 to effect more uniform illumination over a sign such as sign 1. Each lens section 8A, 8B has a sloping surface relative to the centerline 16 so as to refract the light which is emitted from the curved surface of the diffusing medium 5, to distribute the light more uniformly over sign 1.

Further, since the light has further to travel to reach the top of an object or sign to be illuminated than to the bottom, the various angle of refraction of the light leaving the lens sections may be different. One way to achieve a different angle of refraction with the same lens material is by having one section formed thicker than the other as shown in FIG. 9. Another way would be to obtain a different angle of refraction by using lens sections of different material. Thus, each lens section may actually be a separate lens with its own refractive index different from that of the other.

The light source 4 is preferably an incandescent halogen lamp which has advantages over a fluorescent lamp. For example where lower wattage is desired, one 20 watt incandescent halogen lamp can replace two 20 watt fluorescent lamps while providing an improved lighting effect. Such halogen lamps provide higher intensities, with a narrower beam, more uniform brightness (top to bottom of sign), easy relamping through the back without opening the back cover, lower cost and fewer components (socket and lamp versus two lamps, two sockets, a ballast and wiring channel), and require less input power (e.g. 20 watts versus 43 watts). In addition, such lamps produce ultra-violet light which can be made to interact with fluorescent material on the illuminated surface to give enhanced brightness or special effects.

Further, the showing of darkened letters at each end of the sign or of a halo of light along the bottom of the sign is inhibited by the use of the present invention with halogen lamps. Where the electronic sign employs yellow dots for the lettering, these dots or disks remain yellow in appearance in light from the halogen lamp rather than appearing yellow green—as would be common with light from fluorescent lamps. These advantages override a disadvantage of the halogen lamp, namely, that the halogen lamp has a life which is less than that of fluorescent lamps.

In order to facilitate accessibility, tube 2 or 2A may be split longitudinally and at the diffusing medium 5, and thus formed in two nearly half-cylinder sections. The two halves may be joined, together with the lens 8 and diffusing medium 5, by an end ring or cylinder, which for example may carry a gear to be driven by the motor drive assembly.

Instead of illuminating an essentially vertical surface, as shown in FIG. 4, the illumination arrangement of the present invention may be used to provide forward-facing selectable-color light bars. Multiple multi-color illumination arrangements of the invention may also be arranged end to end, as seen in FIG. 10. That figure illustrates use of the present invention in a bus destination sign display, having a section 51 displaying a bus route number, a section 53 displaying a bus destination, and three sections 54, 55, 56, each of which is a structure as described above which displays an elongated bar of a selectable color R, Y, G, B. Thus 3-color codes, up to 64 in number, may be displayed, which would be intelligible at a greater distance than letters or numbers may be legible. Obviously as many sections like 54, 55, 56 may be used as desired, to afford a greater variety of codes. In this arrangement it may be desirable to have the inner tubes communicate with each other at their adjacent ends, which are then left open, with a single light source at one end or a light source at each end. The motor drive assemblies for such arrangements are then arranged to act on the respective outer tubes but not to interfere with light communication between the inner tubes. Alternatively, each segment may be an independent unit, with its own light source and motor drive.

As shown in this figure, the light emitted from the light guide may be enhanced and its distribution improved by use of image enhancer plates which of course may be used with any of the forms of light guide of the present invention. In FIG. 11, image enhancer plates 9 are shown on either side of the gap 14A, inclining inward from a housing assembly 10 towards the outer tube 3. These plates 9 are light-reflective and increase the apparent size of a colored segment of the color tube 3. These image enhancer plates 9 ideally extend longitudinally along the entire length of the outer tube 3 and may further extend transversely at the ends of the outer tube so as to incline outward along the entire periphery of the outer tube's color segment which is exposed to light from the inner tube 2 or 2A.

In an alternate embodiment, the image enhancer plates 9 may incline outward from adjacent the periphery of the light-transmissive portion of the inner tube 2 or 2A. Such arrangements may be used to enhance the light passing through the light-transmissible portion when no color-creating outer tube 3 is employed.

The image enhancer plates 9 help to uniformly distribute and enhance the illuminating effect of the light transmitting through the light-transmissible portion by reflecting light which would not have been directed at the object or sign to be illuminated and thus would have been lost. The enhancer plates thereby capture this otherwise lost light.

An observer looking head-on at the colored segment of the outer tube and the enhancer plates 9 (from the left in FIG. 6) will get an impression of a full rectangle of color, the size of the outer periphery of the plates. This impression is most pronounced when the image enhancer plates have a substantially parabolic curvature, although flat plates are a decided advantage. It can be readily understood that the surfaces of such enhancer plates may be formed otherwise, as desired, to illuminate the sign or object uniformly throughout. Thus, in the usage of FIG. 4 or 6, their surfaces may be formed to reflect more light on the area of the sign 1 furthest away from the tubes 2,3 so that the entire sign would appear to be illuminated by the same intensity of light.

Figure 14:
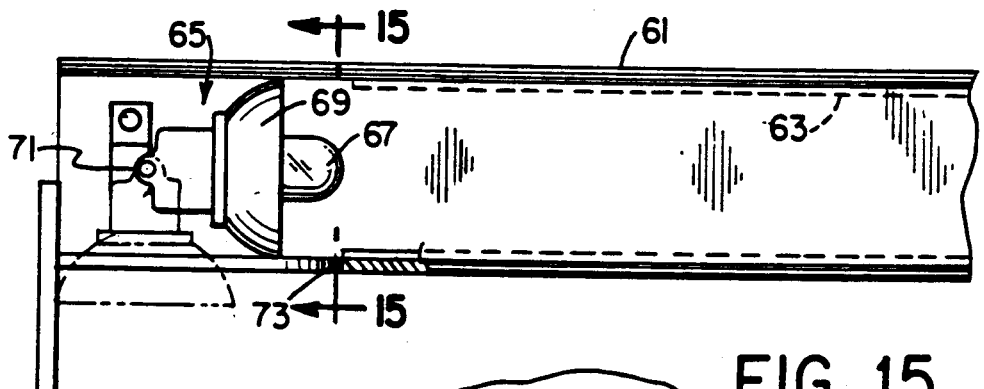
FIG. 14 is a fragmentary longitudinal section of an extended light source utilizing the principles of the invention.
Figure 15:
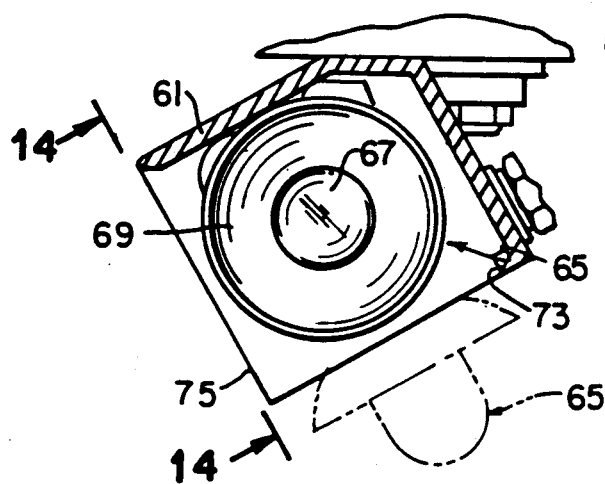
FIG. 15 is a cross-sectional view of FIG. 14 viewed along line 14—14 thereof.

FIGS. 14–15 show an improved arrangement where color change is not needed. Here the housing 61 contains a stationary light guide arrangement 63 whose construction may be that of FIG. 7 or FIG. 9 without the outer tube or its drive. A light source assembly 65 is located at each end of housing 61, comprising a light bulb 67 and reflector 69 for directing light along light guide 63. The source assembly 65 is pivoted at 71 so that it may be extended beyond housing 61 though an opening 73, as seen in dashed line in FIGS. 14 and 15, to permit easy replacement of bulb 67 when needed. Conventional latching means (not shown) usually retain each source 65 in operative position as shown in FIG. 14. Housing 61 is open along one side 75. Thus, an extended generally uniform illumination is provided, of any desired length, determined by the length of light guide arrangement 63.

It will be understood that, where color change is not needed in any of the foregoing forms of the invention, a stationary single-color outer tube may be used in place of the rotatable outer tube, or the outer tube may be dispensed with entirely. In the latter case, the diffusing strip 12 may be appropriately colored, when desired to provide a non-white illumination, such as for photographic dark rooms or night illumination of instrument panels.

Where desired, an extended-length source of infrared or ultra-violet light may be provided by placing an appropriate infra-red or ultra-violet filter between light source 4 or 65 and the light guide, or otherwise inputting only infra-red or ultra-violet light to the light guide.

While the foregoing description and drawings represent the preferred embodiments of the present invention, it will be understood that various changes and modifications may be made without departing from the spirit and scope of the present invention.

What is claimed is:

1. An elongated light-producing arrangement comprising:
 a light source for emitting light;
 an elongated tube having a hollow interior, said tube having a light-transmissible portion extending along the length of said tube and extending only partially around the circumference of said tube, said tube also having a reflective surface for propagating light within and along the axis of the tube, said light source being arranged outside of said tube so as to expose said interior to the light emitted from said light source for reflection by said surface;
 a diffusing medium arranged in said tube extending longitudinally and only partially around the circumference of said tube, substantially diametrically opposite said light-transmissible portion, to diffuse light striking said diffusing medium both directly and by reflection from said reflective surface, said light-transmissible portion, said diffusing medium and said reflective surface in the aggregate extending over substantially the entire surface of said tube, whereby light in said tube impinging on said diffusing medium causes light from the diffusing medium to pass outwardly through said light-transmissible portion.

2. An arrangement as in claim 1 further comprising a reflector at an end of said tube for reflecting light striking said reflector back into the interior of said tube, whereby the light exiting said light-transmissible portion is distributed over the length of said tube.

3. The arrangement as defined in claim 1, wherein said inner surface is formed of a transparent sheet having longitudinally extending prisms formed therein.

4. The arrangement as defined in claim 3, wherein said tube has a surface facing said transparent sheet which is formed to return light transmitted through said sheet back into said interior of said tube.

5. The arrangement as defined in claim 1, wherein said diffusing medium is formed to scatter the light through the light-transmissible portion with substantially uniform intensity along said elongated tube.

6. An elongated light-producing arrangement comprising:
   a light source for emitting light;
   an elongated tube having an interior, said tube having a light-transmissible portion extending along the length of said tube, said tube also having a reflective surface for propagating light along the axis of the tube, said light source being arranged outside of said tube so as to expose said interior to the light emitted from said light source for reflection by said reflective surface;
   a diffusing medium arranged in said tube substantially diametrically opposite said light-transmissible portion to diffuse light striking said diffusing medium both directly and by reflection from said reflective surface, whereby light from the diffusing medium passes through said light-transmissible portion;
   said light source projecting light at an angle to said tube, and
   a reflector arranged between said light source and said elongated tube, said reflector being arranged to reflect the light from said light source into said tube.

7. An elongated light-producing arrangement comprising:
   a light source for emitting light;
   an elongated tube having a hollow interior, said tube having a light-transmissible portion extending along the length of said tube, said tube also having a reflective surface for propagating light along the axis of the tube, said light source being arranged so as to expose said interior to the light emitted from said light source for reflection by said reflective surface;
   a diffusing medium arranged in said tube substantially diametrically opposite said light-transmissible portion to diffuse light striking said diffusing medium both directly and by reflection from said surface, whereby light from the diffusing medium passes through said light-transmissible portion;
   an outer tube having a plurality of light-transmissible colored portions of different colors, said outer tube concentrically surrounding said elongated tube; and
   means for rotating one of said outer tube and said elongated tube relative to the other into a predetermined relative position so that only one of said colored portions is exposed to the light which is transmitted through said light-transmissible portion for effecting selective color illumination.

8. A selectably color-coded elongated light display comprising a plurality of substantially linear segments arranged end to end, each of said segments comprising an arrangement as in claim 7.

9. An arrangement as in claim 7 further including a second light source arranged to emit light into said elongated tube at the end thereof opposite said first light source.

10. An arrangement as in claim 9, wherein each of said light sources is pivotally mounted to permit rotation thereof through substantially 90 degrees whereby said light sources may be readily replaced.

11. An arrangement as in claim 7 wherein the portion of said outer tube of each color is partially transparent and partially reflective for light of the respective color.

12. An elongated light-producing arrangement comprising:
   a light source for emitting light;
   an elongated tube having an interior, said tube having a light-transmissible portion extending along the length of said tube, said tube also having a reflective surface for propagating light along the axis of the tube, said light source being arranged so as to expose said interior to the light emitted from said light source for reflection by said reflective surface;
   a diffusing medium arranged in said tube substantially diametrically opposite said light-transmissible portion to diffuse light striking said diffusing medium both directly and by reflection from said reflective surface, whereby light from the diffusing medium passes through said light-transmissible portion;
   said light-transmissible portion being formed as a longitudinal slit in said elongated tube;
   a lens arrangement having non-parallel surfaces extending longitudinally along said slit for refracting and distributing light over a predetermined region wider than said slit.

13. The arrangement as defined in claim 12, wherein said lens has a plurality of sections of different thicknesses for selectively spreading light over different regions.

14. The arrangement as defined in claim 13, having two said sections, wherein said sections are arranged so that an imaginary plane separates said sections, each of said sections being formed with a surface sloping away from said imaginary plane at a respective angle.

15. The arrangement as defined in claim 12, wherein said lens is linear, prismatic, and clear.

16. An elongated light-producing arrangement comprising:
   a light source for emitting light;
   an elongated tube having an interior, said tube having a light-transmissible portion extending along the length of said tube, said tube also having a reflective surface for propagating light along the axis of the tube, said light source being arranged so as to expose said interior to the light emitted from said light source for reflection by said reflective surface;
   a diffusing medium arranged in said tube substantially diametrically opposite said light-transmissible portion to diffuse light striking said diffusing medium both directly and by reflection from said reflective surface, whereby light from the diffusing medium passes through said light-transmissible portion; and
   a light reflector extending outwardly from each longitudinal edge of said light-transmissible tube portion, said light reflectors also extending longitudinally along said tube whereby the apparent transverse width of said light arrangement is increased.

17. An elongated light-producing arrangement comprising:
   a light source for emitting light;
   an elongated tube having an interior, said tube having a light-transmissible portion extending along the length of said tube, said tube also having a reflective surface for propagating light along the axis of the tube, said light source being arranged so as to expose said interior to the light emitted from said light source for reflection by said reflective surface;
a diffusing medium arranged in said tube substantially diametrically opposite said light-transmissible portion to diffuse light striking said diffusing medium both directly and by reflection from said reflective surface, whereby light from the diffusing medium passes through said light-transmissible portion;
said diffusing medium being formed to scatter the light through the light-transmissible portion with substantially uniform intensity along said elongated tube; and
said diffusing medium having a varying width, which width increases outward away from said light source so as to assist in uniformly illuminating along the length of said elongated tube.

18. An elongated light-producing arrangement comprising:
a light source for emitting light;
an elongated tube having an interior, said tube having a light-transmissible portion extending along the length of said tube, said tube also having a reflective surface for propagating light along the axis of the tube, said light source being arranged so as to expose said interior to the light emitted from said light source for reflection by said reflective surface;
a diffusing medium arranged in said tube substantially diametrically opposite said light-transmissible portion to diffuse light striking said diffusing medium both directly and by reflection from said reflective surface, whereby light from the diffusing medium passes through said light-transmissible portion; and
said diffusing medium having a curved surface projecting inwardly of said tube, said curved surface having varying arcuate width along the length of said medium.

19. A method for illuminating a sign or the like, comprising the steps of:
emitting light from a light source;
exposing to the emitted light the interior of an elongated first tube having a reflective surface;
propagating the light within the interior of the tube by reflecting the light from said reflective surface of the tube;
providing a diffusing medium in a portion of the tube along the length of the tube to diffuse and scatter light impinging therein;
directing the diffused and scattered light transversely outwardly of said tube;
concentrically surrounding said first tube with an outer second tube having a plurality of light-transmissible portions of different colors; and
selectively exposing only one of said light-transmissible color portions to the diffused light.

20. The method as defined in claim 19; further comprising:
expanding the apparent size of the light-transmissible color portions by a reflecting image expander.

21. The method as in claim 19 further including providing an opaque light-reflecting portion in association with each of said light-transmissible portions, each said light-reflecting portion being of substantially the same color as its associated light-transmissible portion.

22. A color display for both daytime and night-time use comprising:
a light source,
a filter in front of said source for transmitting light therethrough of a predetermined color,
said filter having light-transmissible areas interspersed with opaque areas,
said opaque areas being of substantially the same color as said light-transmissible areas,
whereby when observed at night said display presents light of said color from said filter and when observed by day said display appears to have substantially the same color by viewing said opaque areas in ambient light,
said filter being in the form of a cylinder, and
said light-transmissible and opaque areas being in alternating bands extending circumferentially about said cylinder.

23. A display element for displaying a predetermined color comprising
light-transmissible areas interspersed with opaque areas,
said light-transmissible areas being adapted to transmit light of said predetermined color, and
said opaque areas having a visually perceptible color in ambient light which is substantially the same as said predetermined color,
said display element being in the form of a cylinder, said light-transmissible and opaque areas being in alternating bands extending around said cylinder,
whereby said element may display said predetermined color whether viewed in ambient light as in daytime or illuminated from the rear thereof by an artificial light source.

24. A display element in claim 23 wherein said cylinder is divided into a plurality of segments, each segment having said light-transmissible and opaque areas of a single respective color.

25. A display element as in claim 24 wherein said cylinder segments are quadrants of said cylinder.

26. In an elongated illuminating arrangement,
an elongated tube having a hollow interior and having the property of propagating light axially therewithin,
said tube having a light-transmissible wall portion extending along the length of said tube and extending only partially around the circumference of said tube,
said tube also having an inner reflective surface for propagating light within and along the axis of the tube by reflection by said surface when light is supplied to said interior,
a diffusing medium arranged in said tube extending longitudinally and only partially around the inner periphery of said tube, substantially diametrically opposite said light-transmissible portion and adapted to diffuse light striking said diffusing medium both directly and by reflection from said reflective surface,
said light-transmissible wall portion, said diffusing medium and said reflective surface in the aggregate extending longitudinally of said tube and over substantially the entire inner periphery of said tube,
whereby light in said tube impinging on said diffusing medium causes light from the diffusing medium to pass outwardly through said light-transmissible portion.

27. An arrangement as in claim 26 further comprising:
a reflector at an end of said tube for reflecting light striking said reflector back into the interior of said tube, whereby the light exiting said light-transmissible portion is distributed over the length of said tube.

28. The arrangement according to claim 26, further comprising:
an outer tube having a plurality of light-transmissible colored portions of different colors, said outer tube concentrically surrounding said elongated tube; and
means for rotating one of said outer tube and said elongated tube relative to the other into a predetermined relative position so that only one of said colored portions is exposed to light which is transmitted through said light transmissible portion, for effecting select color illumination.

29. A selectably color-coded elongated light display comprising a plurality of substantially linear segments arranged end to end, each of said segments comprising an arrangement as in claim 28.

30. The arrangement as defined in claim 30, wherein said tube has a surface facing said transparent sheet which is formed to return light transmitted through said sheet back into said interior of said tube.

31. The arrangement as defined in claim 30, wherein said tube has a surface facing said transparent sheet which is formed to return light transmitted through said sheet back into said interior of said tube.

32. The arrangement as defined in claim 26, for illuminating a sign or the like,
wherein said light-transmissible portion is formed as a longitudinal slit in said elongated tube,
the arrangement further comprising a lens arrangement in said slit for distributing light over a predetermined region wider than said slit.

33. The arrangement as defined in claim 32, wherein said lens has a plurality of sections of different thicknesses for selectively spreading light over different regions.

34. The arrangement as defined in claim 33, having two said lens sections, wherein said sections are arranged so that each of said sections is formed with a surface sloping away at a respective angle from an imaginary plane separately said sections.

35. The arrangement as defined in claim 32, wherein said lens is linear and prismatic.

36. The arrangement as defined in claim 26, further comprising:
a light reflector extending outwardly from each longitudinal edge of said light-transmissible tube portion, said light reflectors also extending longitudinally along said tube, whereby the apparent transverse width of said light arrangement is increased.

37. The arrangement as defined in claim 26, wherein said diffusing medium is formed to scatter the light through the light-transmissible portion with substantially uniform intensity along said elongated tube.

38. The arrangement as defined in claim 26, wherein said diffusing medium has a varying width, so as to assist in uniformly illuminating along the length of said elongated tube.

39. The arrangement as defined in claim 26, wherein said diffusing medium has a curved surface projecting inwardly of said tube, said curved surface having varying arcuate width along the length of said medium.

* * * * *

UNITED STATES PATENT AND TRADEMARK OFFICE
CERTIFICATE OF CORRECTION

PATENT NO. : 4,996,632
DATED : February 26, 1991
INVENTOR(S) : Wallace R. Aikens It is certified that error appears in the above-identified patent and that said Letters Patent is hereby corrected as shown below:

Column 13, lines 21-25:

Claim 30 should be replaced by the following:

30. The arrangement as defined in claim 26, wherein said tube surface is formed of a transparent sheet having longitudinally extending prisms formed therein.

Signed and Sealed this

Twenty-ninth Day of June, 1993

*Attest:*

MICHAEL K. KIRK

*Attesting Officer*

*Acting Commissioner of Patents and Trademarks*